United States Patent
Nabe et al.

(10) Patent No.: US 7,463,559 B2
(45) Date of Patent: Dec. 9, 2008

(54) OPTICAL DISK APPARATUS

(75) Inventors: Mitsuhiro Nabe, Gunma (JP); Naomi Uchida, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 868 days.

(21) Appl. No.: 11/038,583

(22) Filed: Jan. 21, 2005

(65) Prior Publication Data

US 2005/0174921 A1    Aug. 11, 2005

(30) Foreign Application Priority Data

Jan. 30, 2004    (JP)    ............................. 2004-024275

(51) Int. Cl.
   *G11B 7/00*    (2006.01)
(52) U.S. Cl. ...................... 369/44.12; 369/99; 369/135; 720/685
(58) Field of Classification Search .............. 369/44.12, 369/99, 135; 720/685
   See application file for complete search history.

(56) References Cited

U.S. PATENT DOCUMENTS 6,787,811 B2 *   9/2004   Saito et al. ..................... 257/84

FOREIGN PATENT DOCUMENTS

| JP | 58122777 | A | * | 7/1983 |
| JP | 60201680 | A | * | 10/1985 |
| JP | 05089846 | A | * | 4/1993 |
| JP | 2003-228866 | | | 8/2003 |

* cited by examiner

*Primary Examiner*—Joseph Feild
*Assistant Examiner*—Parul Gupta
(74) *Attorney, Agent, or Firm*—Fish & Richardson P.C.

(57) ABSTRACT

First, second, and third lead-out conductors connected to the electrodes of two types of laser emission devices of an optical pickup are led out on a lead-out board. First connection areas short-circuit by solder at a portion of opposing parts of any two adjacent lead-out conductors of the first, second, and third lead-out conductors in the width direction crossing the longitudinal direction and open the short circuit, and second connection areas short-circuit by solder at a portion of opposing parts of the other pair of two adjacent lead-out conductors of the first, second, and third lead-out conductors in the width direction crossing the longitudinal direction and open the short circuit. The first connection areas and the second connection areas are arranged in a staggered pattern in the longitudinal direction of the lead-out conductors.

10 Claims, 6 Drawing Sheets

FIG.7C

OPTICAL DISK APPARATUS

CROSS-REFERENCE TO RELATED APPLICATIONS

The present application claims priority upon Japanese Patent Application No. 2004-24275 filed on Jan. 30, 2004, which is herein incorporated by reference.

BACKGROUND OF THE INVENTION

1. Field of the Invention

The present invention relates to an optical disk apparatus.

2. Description of the Related Art

There is a possibility that a laser emission device of an optical pickup used in an optical disk apparatus deteriorates or is destroyed due to electrostatic from a worker performing the assembly of optical disk apparatuses, or the like in assembly processes of the optical pickup and of the optical disk apparatus. Hence, in such assembly processes, in order to protect the laser emission device from electrostatic, lead-out conductors connected respectively to the anode and cathode electrodes of the laser emission device in a state of being not connected to a circuit are short-circuited on the lead-out board by connecting them with solder.

Furthermore, for the emission of the laser emission device during adjustment, inspection and the like, performed in the assembly process of the optical pickup, such as the adjustment of the emission intensity of the laser emission device, and the skew adjustment and the positional alignment with the photo detector of an objective lens drive mechanism, the lead-out conductors soldered to each other on the lead-out board need to be unsoldered to open the short circuit between both the electrodes. On the other hand, after the adjustment and inspection, in order to protect the laser emission device, the lead-out conductors are soldered to be short-circuited.

Also in the product assembly process after the optical pickup assembly process, for the emission of the laser emission device during product adjustment, inspection, and the like, the lead-out conductors connected by solder on the lead-out board need to be unsoldered to open the short circuit between both the electrodes.

On the other hand, after the product adjustment and inspection, in order to protect the laser emission device, the lead-out conductors are soldered to be short-circuited. Moreover, in the final process, after connecting a circuit board having circuits for driving an optical disk apparatus mounted thereon to the lead-out board, the lead-out conductors on the lead-out board need to be unsoldered to open the short circuit between both the electrodes, for the emission of the laser emission device.

As described above, in the assembly processes of optical pickups and of optical disk apparatuses, the lead-out conductors on lead-out boards need to be soldered and unsoldered repeatedly.

In recent years, there have been provided optical disk apparatuses capable of recording or playing back both CDs (Compact Disks) and DVDs (Digital Versatile Disks) in the market. Some of optical pickups used in these optical disk apparatuses comprise a laser emission device for CD to emit laser light for recording or playing back CDs and a laser emission device for DVD to emit laser light for recording or playing back DVDs different in wavelength from the laser light for CD. Such an optical pickup is electrically connected to a main circuit board having circuits for controlling the operations of the optical disk apparatus mounted thereon to operate, and is provided with a lead-out board (e.g., a flexible printed board) that serves as an electrical connection link-up between the main circuit board and the optical pickup. On the lead-out board, for the emission of the two laser emission devices, there are provided lead-out conductors electrically connected to the anode and cathode electrodes of each laser emission device.

Figure 7A:
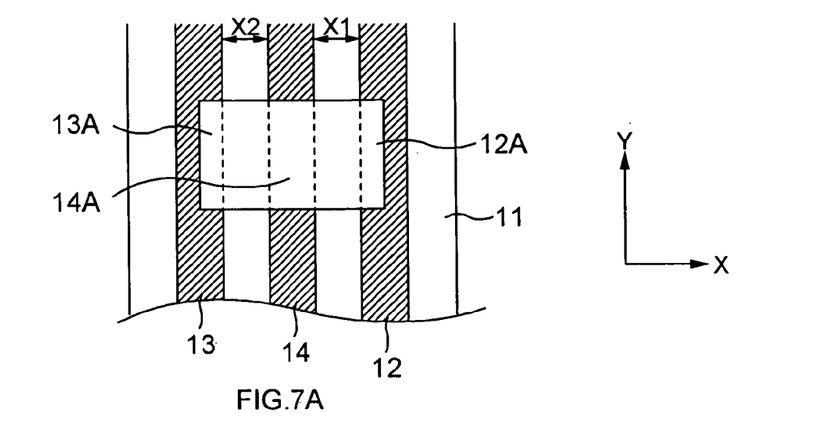
FIGS. 7A-7C are views each showing an example of the related art concerning lead-out conductors on a lead-out board.

FIG. 7A shows an example of short circuits between both electrodes of the laser emission device for CD and between both electrodes of the laser emission device for DVD of the optical pickup provided in an optical disk apparatus.

A lead-out board 11 is provided for electrically connecting an optical pickup to a main circuit board (not shown) having circuits for controlling the operation of the optical disk apparatus mounted thereon. A lead-out conductor 12 is connected to one electrode (e.g., the anode electrode) of the laser emission device for CD and led out. A lead-out conductor 13 is connected to one electrode, which is of the same polarity as the one electrode of the laser emission device for CD, (e.g., the anode electrode) of the laser emission device for DVD and led out. A lead-out conductor 14 is connected to both the other electrodes (e.g., the cathode electrodes) of the laser emission devices for CD and for DVD and led out. The lead-out conductors 12, 13, 14 are provided predetermined spaces X1, X2 apart respectively on the lead-out board 11 in the width direction (X direction) crossing the longitudinal direction of the lead-out conductors (Y direction).

The anode and cathode electrodes of the laser emission device for CD are short-circuited by solder extending in the X and Y directions over an area 12A, partial-width part of the lead-out conductor 12, opposite the lead-out conductor 14; over an area 14A, full-width part of the lead-out conductor 14; and over the predetermined space X1 between areas 12A and 14A. Furthermore, the anode and cathode electrodes of the laser emission device for DVD are short-circuited by solder extending in the X and Y directions over an area 13A, partial-width part of the lead-out conductor 13, opposite the lead-out conductor 14; over area 14A, full-width part of the lead-out conductor 14; and over the predetermined space X2 between areas 13A and 14A. That is, both electrodes of the laser emission device for CD and both electrodes of the laser emission device for DVD are short-circuited respectively as above, and thereby become of the same potential and free of the influence of electrostatic. Hence, the deterioration and destruction of the laser emission devices can be prevented. See for example Japanese Patent Application Laid-open Publication No. 2003-228866.

However, in the assembly processes of optical pickups and of optical disk apparatuses, the lead-out conductors 12, 13, 14 on the lead-out board 11 are soldered and unsoldered repeatedly, and hence, may be damaged by solder. Especially when using so-called lead-free solder including no lead, such damage is significant. This is because, as the copper component of solder (Sn(tin)-Ag(silver)-Cu(copper)) increases in concentration from 0.5% to 2%, temperatures of soldering irons rise.

Figure 7B:
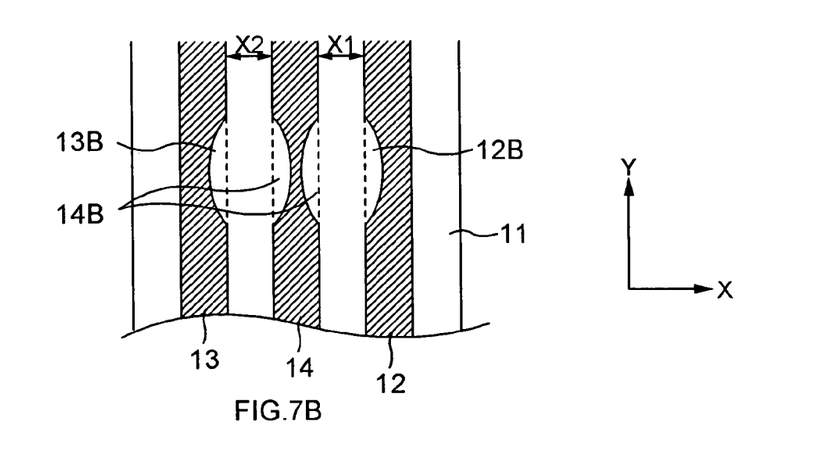
Figure 7C:
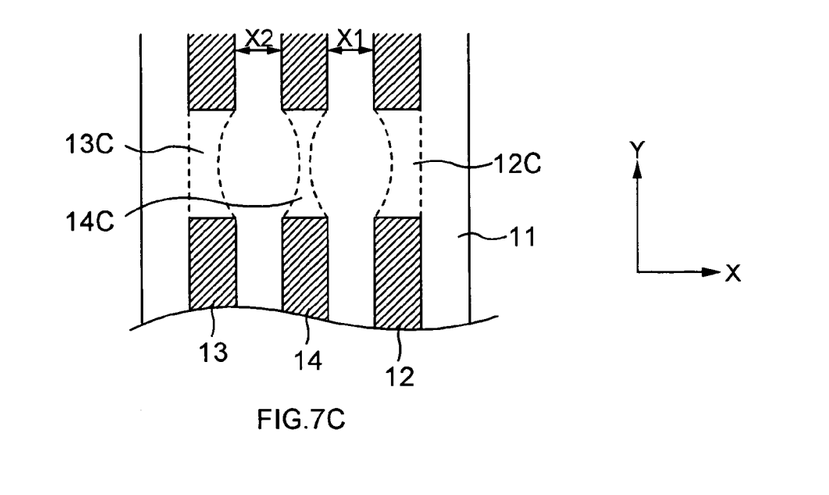

FIGS. 7B and 7C are views showing the lead-out conductors 12, 13, 14 of FIG. 7A having been damaged due to repetition of soldering and unsoldering with lead-free solder in the assembly process of the optical pickup or optical disk apparatus.

When the lead-out conductors 12, 13, 14 on the lead-out board 11 are soldered (FIG. 7A) and unsoldered (not shown) repeatedly, as shown in FIG. 7B, the lead-out conductor 12 has an area 12B, partial-width part, opposite the lead-out conductor 14 peeled off by solder. Furthermore, the lead-out conductor 13 has an area 13B, partial-width part, opposite the lead-out conductor 14 peeled off. Moreover, the lead-out conductor 14 has areas 14B, partial-width parts, respectively opposite the lead-out conductors 12 and 13 peeled off. Thus, the lead-out conductor 12 is partially narrowed in the X direction by area 12B peeled off (the conductor 12 becoming thinner), the lead-out conductor 13 is partially narrowed in the X direction by area 13B peeled off (the conductor 13 becoming thinner), and the lead-out conductor 14 is partially narrowed in the X direction by areas 14B peeled off (the conductor 14 becoming thinner).

If the lead-out conductors 12, 13, 14 on the lead-out board 11 in the state shown in FIG. 7B are soldered and unsoldered further repeatedly, the lead-out conductor 12 has an area 12C peeled off by solder. Furthermore, the lead-out conductor 13 has an area 13C peeled off. Moreover, the lead-out conductor 14 has an area 14C peeled off. Hence, the lead-out conductors 12, 13, 14 are broken in the Y direction, and thus the optical pickup cannot be used.

SUMMARY OF THE INVENTION

Thus, an object of the present invention is to provide an optical disk apparatus wherein, when soldering and unsoldering are repeated in the assembly process of the optical pickup or optical disk apparatus, lead-out conductors on the lead-out board connected to the electrodes of the laser emission devices of the optical pickup are prevented from breaking, and thus the optical pickup is not discarded.

According to an aspect of the present invention to solve the above problem, there is provided an optical disk apparatus comprising an optical pickup that has a first laser emission device emitting laser light for recording or playing back signals on or from a first disk medium and a second laser emission device emitting laser light for recording or playing back signals on or from a second disk medium different in a signal format from the first disk medium, a lead-out board on which a first lead-out conductor connected to one electrode of the first laser emission device and led out, a second lead-out conductor connected to one electrode, which is of the same polarity as the one electrode of the first laser emission device, of the second laser emission device and led out, and a third lead-out conductor connected to both the other electrodes of the first and second laser emission devices and led out are arranged respective predetermined spaces apart, and which is to be electrically connected to a circuit board having circuits for driving an optical disk apparatus mounted thereon, first connection areas to short-circuit by solder at a portion of opposing parts of any two adjacent lead-out conductors of the first, second, and third lead-out conductors partially in the width direction crossing the longitudinal direction and to open the short circuit, and second connection areas to short-circuit by solder at a portion of opposing parts of the other pair of two adjacent lead-out conductors of the first, second, and third lead-out conductors partially in the width direction crossing the longitudinal direction and to open the short circuit, wherein the first connection areas and the second connection areas are arranged in a staggered pattern in the longitudinal direction of the lead-out conductors.

There is also provided an optical disk apparatus comprising an optical pickup that has a first laser emission device emitting laser light for recording or playing back signals on or from a first disk medium and a second laser emission device emitting laser light for recording or playing back signals on or from a second disk medium different in a signal format from the first disk medium, a lead-out board on which a first lead-out conductor connected to one electrode of the first laser emission device and led out, a second lead-out conductor connected to one electrode, which is of the same polarity as the one electrode of the first laser emission device, of the second laser emission device and led out, and a third lead-out conductor connected to both the other electrodes of the first and second laser emission devices and led out are arranged respective predetermined spaces apart, and which is to be electrically connected to a circuit board having circuits for driving an optical disk apparatus mounted thereon, first branch areas having branches extending from any two adjacent lead-out conductors of the first, second, and third lead-out conductors in the width direction crossing the longitudinal direction and opposing to each other at their ends to short-circuit by solder the any two adjacent lead-out conductors and to open the short circuit, and second branch areas having branches extending from the other pair of two adjacent lead-out conductors of the first, second, and third lead-out conductors in the width direction crossing the longitudinal direction and opposing to each other at their ends to short-circuit by solder the two adjacent lead-out conductors of the other pair and to open the short-circuit, wherein the first branch area and the second branch area are arranged in the longitudinal direction of the lead-out conductors.

Further, there is provided an optical disk apparatus comprising an optical pickup that has a first laser emission device emitting laser light for recording or playing back signals on or from a first disk medium and a second laser emission device emitting laser light for recording or playing back signals on or from a second disk medium different in a signal format from the first disk medium, a lead-out board on which a first lead-out conductor connected to one electrode of the first laser emission device and led out, a second lead-out conductor connected to one electrode, which is of the same polarity as the one electrode of the first laser emission device, of the second laser emission device and led out, and a third lead-out conductor connected to both the other electrodes of the first and second laser emission devices and led out are arranged respective predetermined spaces apart, and which is to be electrically connected to a circuit board having circuits for driving an optical disk apparatus mounted thereon, connection areas to short-circuit by solder at a portion of opposite parts of any two adjacent lead-out conductors of the first, second, and third lead-out conductors partially in the width direction crossing the longitudinal direction and to open the short circuit, and branch areas having branches extending from the other pair of two adjacent lead-out conductors of the first, second, and third lead-out conductors in the width direction crossing the longitudinal direction and opposing to each other at their ends to short-circuit by solder the two adjacent lead-out conductors of the other pair and to open the short circuit, wherein the connection areas and the branch areas are arranged in the longitudinal direction of the lead-out conductors.

Features and objects of the present invention other than the above will become clear by reading the description of the present specification with reference to the accompanying drawings.

BRIEF DESCRIPTION OF THE DRAWINGS

For more complete understanding of the present invention and the advantages thereof, reference is now made to the following description taken in conjunction with the accompanying drawings wherein:

FIG. 1 is a view showing the configuration outline of an optical disk apparatus that the present invention is applied to;

FIG. 2 is a view showing the configuration outline of the optical pickup of the optical disk apparatus that the present invention is applied to;

DETAILED DESCRIPTION OF THE INVENTION

At least the following matters will be made clear by the explanation in the present specification and the description of the accompanying drawings.

Configuration Outline of an Optical Disk Apparatus

Figure 1:
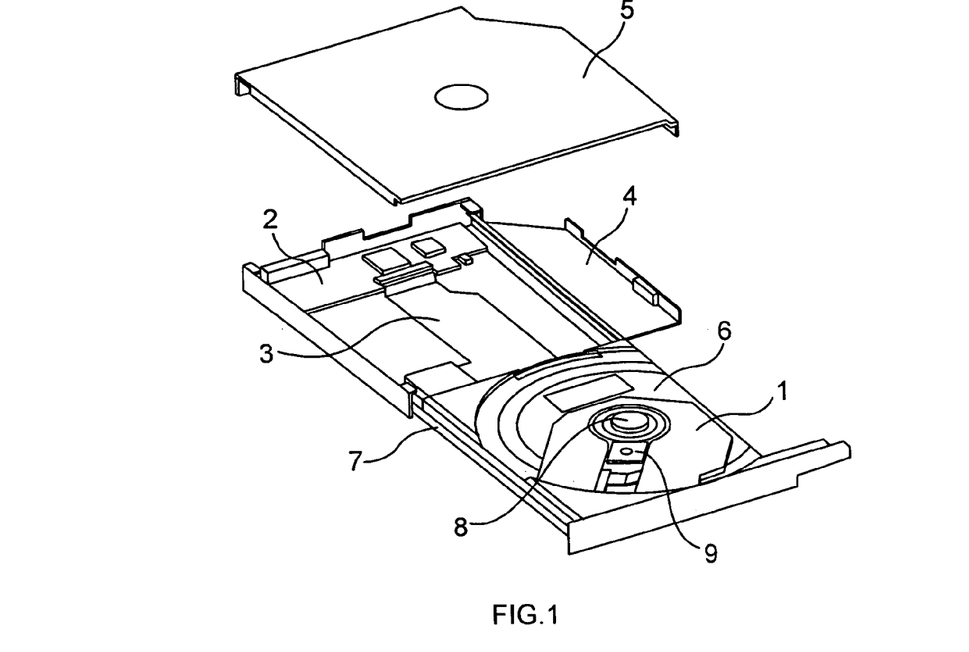

With reference to FIG. 1, the outline of an optical disk apparatus that the present invention is applied to will be explained. FIG. 1 is a view showing the configuration outline of an optical disk apparatus that the present invention is applied to.

In FIG. 1, an optical pickup advance mechanism 1 is held on a disk tray 6 via an anti-vibration rubber (not shown). A main circuit board 2 has circuits for performing signal recording or playback on a disk medium (not shown) and for driving the optical disk apparatus mounted thereon, and is fixed to a bottom case 4. A top case 5 is fixed to the bottom case 4 in order to protect the main circuit board 2 and the like. The disk tray 6 is movably held on the bottom case 4 via a rail mechanism 7. When the disk tray 6 is in a state of being pulled out, a disk medium is mounted and demounted. Furthermore, the optical disk apparatus is configured such that the disk tray 6 is locked not to come out when the disk tray 6 is retracted to be at a predetermined position in the apparatus and also configured to have an ejection mechanism wherein, in the ejection operation, the lock is opened and then the disk tray 6 is pulled out. A flexible printed board 3 electrically connects the main circuit board 2 and the optical pickup advance mechanism 1 and is provided for maintaining electrical connection between the main circuit board 2 and the optical pickup advance mechanism 1 even if the disk tray 6 with the optical pickup advance mechanism 1 fixed thereto moves. A disk motor 8 is fixed to the optical pickup advance mechanism 1 so as to hold a disk medium via a chucking mechanism on its top. An optical pickup 9 is held in the optical pickup advance mechanism 1 so as to be able to move in the radial direction of the disk medium.

Configuration Outline of the Optical Pickup

Figure 2:
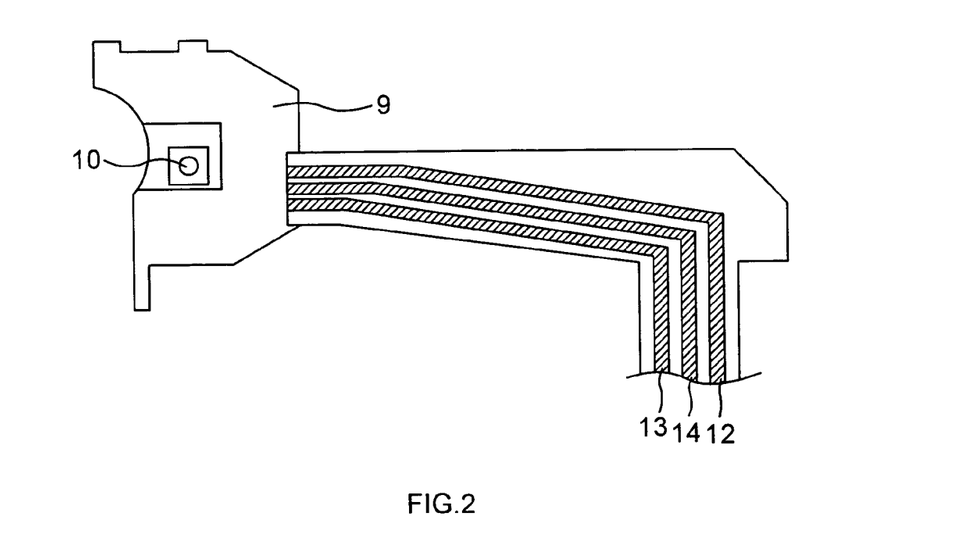

With reference to FIGS. 1 and 2, the outline of the optical pickup of an optical disk apparatus that the present invention is applied to will be explained. FIG. 2 is a view showing the configuration outline of the optical pickup 9 of FIG. 1.

In FIG. 2, the optical pickup 9 has a laser emission device and a photo detector for CDs (Compact Disks, first disk media), and a laser emission device and a photo detector for DVDs (Digital Versatile Disks, second disk media) incorporated therein. The optical pickup 9 has laser light emitted by the laser emission device for CD or DVD imaged via an objective lens 10 on a CD or DVD, converts reflected light from CD or DVD into an electrical signal via the respective photo detector, and outputs the electrical signal to a lead-out board 11 on which are provided optical pickup led-out wires including a lead-out conductor 12 connected to, e.g., the anode electrode (one electrode) of the laser emission device for CD and led out, a lead-out conductor 13 connected to, e.g., the anode electrode, which is of the same polarity as the one electrode, of the laser emission device for DVD and led out, and a lead-out conductor 14 connected to, e.g., both the cathode electrodes (the other electrodes) of the laser emission devices for CD and for DVD and led out. The lead-out board 11 is provided for electrically connecting the main circuit board 2 and the optical pickup 9 via the flexible printed board 3.

FIRST EMBODIMENT

Figure 3:
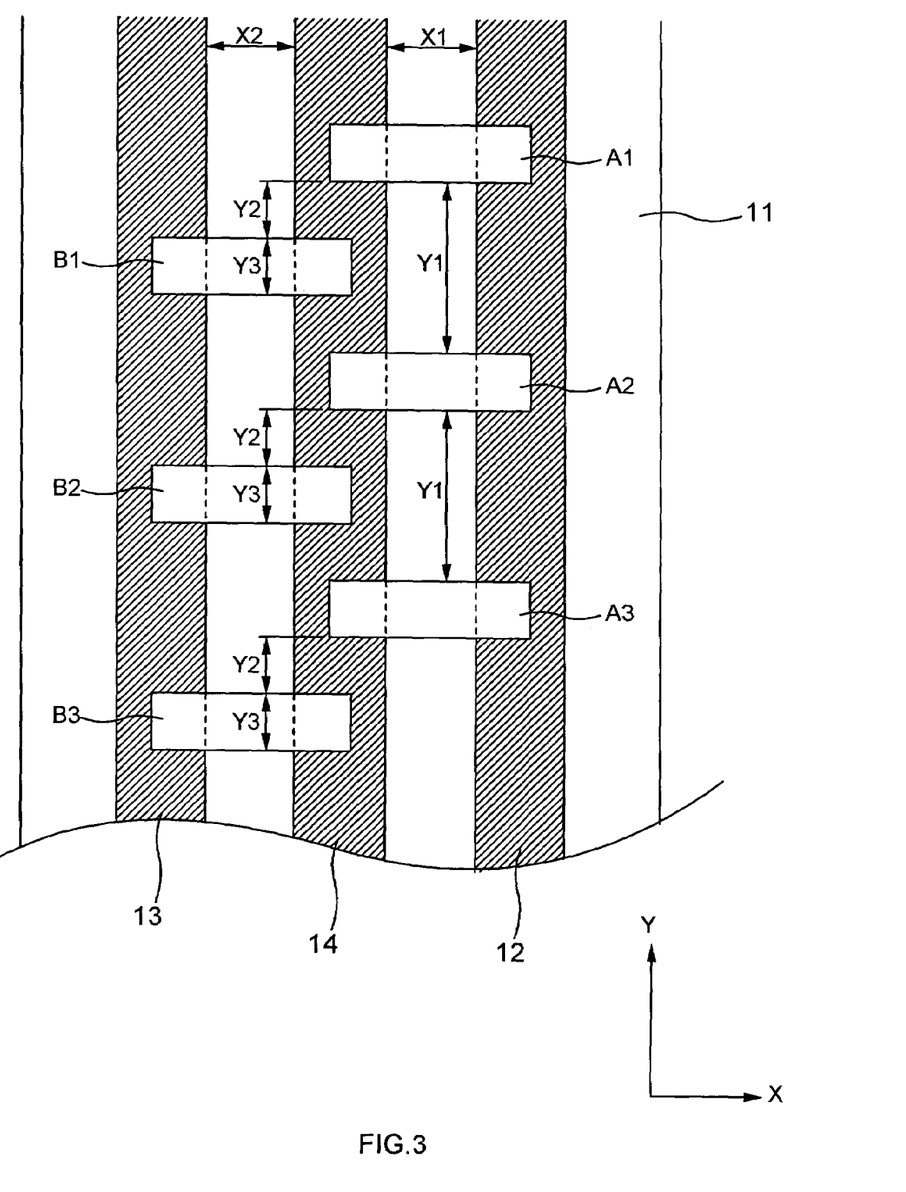
FIG. 3 is a view showing a first embodiment of the optical disk apparatus according to the present invention.

FIG. 3 shows a first embodiment of the present invention. With reference to FIGS. 1 to 3, a specific configuration of short circuits and opening thereof between the anode and cathode electrodes of the laser emission device for CD and between the anode and cathode electrodes of the laser emission device for DVD of the optical pickup 9 of an optical disk apparatus that the present invention is applied to will be explained.

The lead-out board 11 is provided for electrically connecting the main circuit board 2 and the optical pickup 9 via the flexible printed board 3. A lead-out conductor 12 is connected to, e.g., the anode electrode of the laser emission device for CD and led out, a lead-out conductor 13 is connected to, e.g., the anode electrode of the laser emission device for DVD and led out, and a lead-out conductor 14 is connected to, e.g., both the cathode electrodes (for example, at ground potential) of the laser emission devices for CD and for DVD and led out. The lead-out conductor 14 is disposed between the lead-out conductors 12, 13 on the lead-out board 11 in the width direction (X direction) crossing the longitudinal direction of the lead-out conductors (Y direction). The lead-out conductor 12 is disposed a predetermined space X1 apart from the lead-out conductor 14 in the X direction, and the lead-out conductor 13 is disposed a predetermined space X2 apart from the lead-out conductor 14. Note that the predetermined spaces X1, X2 may be equal, or one may be longer than the other, and they can be set according to need.

Between the lead-out conductors 12 and 14, there are provided connection areas A (first connection areas) for short-circuiting the lead-out conductors 12 and 14 and opening the short circuit. These connection areas A have a length in the X direction covering opposite partial-width parts of the lead-out conductors 12 and 14 (e.g., covering a portion of opposing parts of the two adjacent lead-out conductors 12, 14 partially in the width direction), the length being longer than space X1, and have a predetermined length in the Y direction. Note that the length in the Y direction of connection areas A may be equal to, shorter, or longer than the length in the Y direction and can be set according to need. The plurality of connection areas A are disposed a predetermined space Y1 apart in the Y direction between the lead-out conductors 12 and 14. In this embodiment, for example, three connection areas A1, A2, A3 are disposed. And by soldering any of connection areas A1, A2, A3, the anode and cathode electrodes of the laser emission device for CD are short-circuited. On the other hand, by removing solder from connection areas A1, A2, A3, the short circuit between the anode and cathode electrodes of the laser emission device for CD is opened.

In contrast, between the lead-out conductors 13 and 14, there are provided connection areas B (second connection areas) for short-circuiting the lead-out conductors 13 and 14 and opening the short circuit. These connection areas B have a length in the X direction covering opposite partial-width parts of the lead-out conductors 13 and 14 (e.g., covering a portion of opposing parts of the two adjacent lead-out conductors 13, 14 partially in the width direction), the length being longer than space X2, have a predetermined length Y3 in the Y direction, and are disposed a predetermined space Y2 apart from connection areas A (Y2+Y3 being shorter than Y1). Note that the length Y3 in the Y direction of connection areas B may be equal to, shorter, or longer than the length in the X direction and can be set according to need. Also, space Y2 between connection areas A and B can be set according to need.

The plurality of connection areas B are disposed in the Y direction between the lead-out conductors 13 and 14. In this embodiment, for example, three connection areas B1, B2, B3 are disposed predetermined space Y2 apart respectively from connection areas A1, A2, A3. Thus, connection areas A1, A2, A3 and B1, B2, B3 are disposed in a staggered pattern in the Y direction. And by soldering any of connection areas B1, B2, B3, the anode and cathode electrodes of the laser emission device for DVD are short-circuited. On the other hand, by removing solder from connection areas B1, B2, B3, the short circuit between the anode and cathode electrodes of the laser emission device for DVD is opened. Note that an insulation layer is provided on the lead-out board 11 except connection areas A1, A2, A3 and B1, B2, B3.

In order to protect the laser emission devices of the optical pickup 9 from electrostatic from a worker performing the assembly of optical disk apparatuses, or the like, the anode and cathode electrodes of the laser emission device for CD are short-circuited by soldering any of connection areas A1, A2, A3, and the anode and cathode electrodes of the laser emission device for DVD are short-circuited by soldering any of connection areas B1, B2, B3. That is, by soldering any of connection areas A1, A2, A3, the anode and cathode electrodes of the laser emission device for CD become of the same potential and free of the influence of electrostatic. Likewise, by soldering any of connection areas B1, B2, B3, the anode and cathode electrodes of the laser emission device for DVD become of the same potential and free of the influence of electrostatic.

On the other hand, for the emission of the laser emission devices for CD and for DVD in adjustment, inspection, and the like, performed in the assembly process of the optical pickup, such as the adjustment of the emission intensity of the laser emission device, and the skew adjustment and the positional alignment with the photo detector of an objective lens drive mechanism, short circuits between the anode and cathode electrodes of the laser emission device for CD and between the anode and cathode electrodes of the laser emission device for DVD need to be opened. Hence, by removing solder from the any of connection areas A1, A2, A3, the short-circuit between both electrodes of the laser emission device for CD is opened, and by removing solder from the any of connection areas B1, B2, B3, the short-circuit between both electrodes of the laser emission device for DVD is opened.

After adjustment and inspection of the optical pickup 9 with the emission of the laser emission devices for CD and for DVD, in order to protect the laser emission devices of the optical pickup 9 from electrostatic from a worker performing the assembly of optical disk apparatuses, or the like, the anode and cathode electrodes of the laser emission device for CD are short-circuited again by soldering any of connection areas A1, A2, A3, and the anode and cathode electrodes of the laser emission device for DVD are short-circuited by soldering any of connection areas B1, B2, B3.

Also in adjustment to the apparatus mechanical portion (e.g., the optical pickup advance mechanism 1) after the assembly of the optical pickup, the adjustment being part of the assembly of the optical disk apparatus, short circuits between the anode and cathode electrodes of the laser emission device for CD and between the anode and cathode electrodes of the laser emission device for DVD of the optical pickup 9 need to be opened.

Accordingly, by removing solder from the any of connection areas A1, A2, A3 between the anode and cathode electrodes of the laser emission device for CD, the short circuit between both electrodes of the laser emission device for CD is opened, and by removing solder from the any of connection areas B1, B2, B3 between the anode and cathode electrodes of the laser emission device for DVD, the short-circuit between both electrodes of the laser emission device for DVD is opened.

After the adjustment of the optical pickup 9 to the apparatus mechanical portion that is part of the assembly process of the optical disk apparatus, in order to protect the laser emission devices for CD and for DVD from electrostatic from a worker performing the assembly of optical disk apparatuses, or the like, the anode and cathode electrodes of the laser emission device for CD are short-circuited again by soldering any of connection areas A1, A2, A3, and the anode and cathode electrodes of the laser emission device for DVD are short-circuited by soldering any of connection areas B1, B2, B3.

When integrating the optical pickup into the apparatus mechanical portion, the integration is performed with the anode and cathode electrodes of the laser emission devices for CD and for DVD short-circuited, and finishes with connecting the main circuit board 2 to the flexible printed board 3. After that, by removing solder from the any of connection areas A1, A2, A3 between the anode and cathode electrodes of the laser emission device for CD, the short circuit between both electrodes of the laser emission device for CD is opened, and by removing solder from the any of connection areas B1, B2, B3 between the anode and cathode electrodes of the laser emission device for DVD, the short circuit between both electrodes of the laser emission device for DVD is opened. Further, a top case 5 and a bottom case 4 are attached.

According to the above first embodiment, during the assembly processes of the optical pickup and of the optical disk apparatus, soldering and unsoldering connection areas A1, A2, A3 are repeated at least three times for short-circuiting the anode and cathode electrodes of the laser emission device for CD and opening the short-circuit. If, during that, the lead-out conductors 12, 14 are partially peeled off by solder at any of connection areas A1, A2, A3, by soldering and unsoldering either of the other connection areas (A2, A3 where the lead-out conductors 12, 14 have been partially peeled off at connection area A1), it is possible to short-circuit the anode and cathode electrodes of the laser emission device for CD and open the short circuit. If the lead-out conductors 12, 14 have been partially peeled off, the parts in the X direction of the lead-out conductors 12, 14 will be partially left thereby preventing the lead-out conductors 12, 14 from breaking. Likewise, soldering and unsoldering connection areas B1, B2, B3 are repeated at least three times for short-circuiting the anode and cathode electrodes of the laser emission device for DVD and opening the short circuit. If, during that, the lead-out conductors 13, 14 are partially peeled off by solder at any of connection areas B1, B2, B3, by soldering and unsoldering either of the other connection areas (B2, B3 where the lead-out conductors 13, 14 have been partially peeled off at connection area B1), it is possible to short-circuit the anode and cathode electrodes of the laser emission device for DVD and open the short-circuit. If the lead-out conductors 13, 14 have been partially peeled off, the parts in the X direction of the lead-out conductors 13, 14 will be partially left thereby preventing the lead-out conductors 13, 14 from breaking. Moreover, because connection areas A1, A2, A3 and B1, B2, B3 are disposed in a staggered pattern in the Y direction, if the lead-out conductor 14 has been partially peeled off at connection areas A1 and B1 by solder, the part of the lead-out conductor 14 will be partially left thereby preventing the lead-out conductor 14 from breaking. In particular, where lead-free solder (Sn(tin)-Ag(silver)-Cu(copper)) with higher concentration of copper is used in which case the peeling-off of lead-out conductors is significant, it is possible to short-circuit the anode and cathode electrodes of the laser emission devices for CD and for DVD and open the short-circuit even if the lead-out conductors 12, 13, 14 are partially peeled off.

SECOND EMBODIMENT

Figure 4:
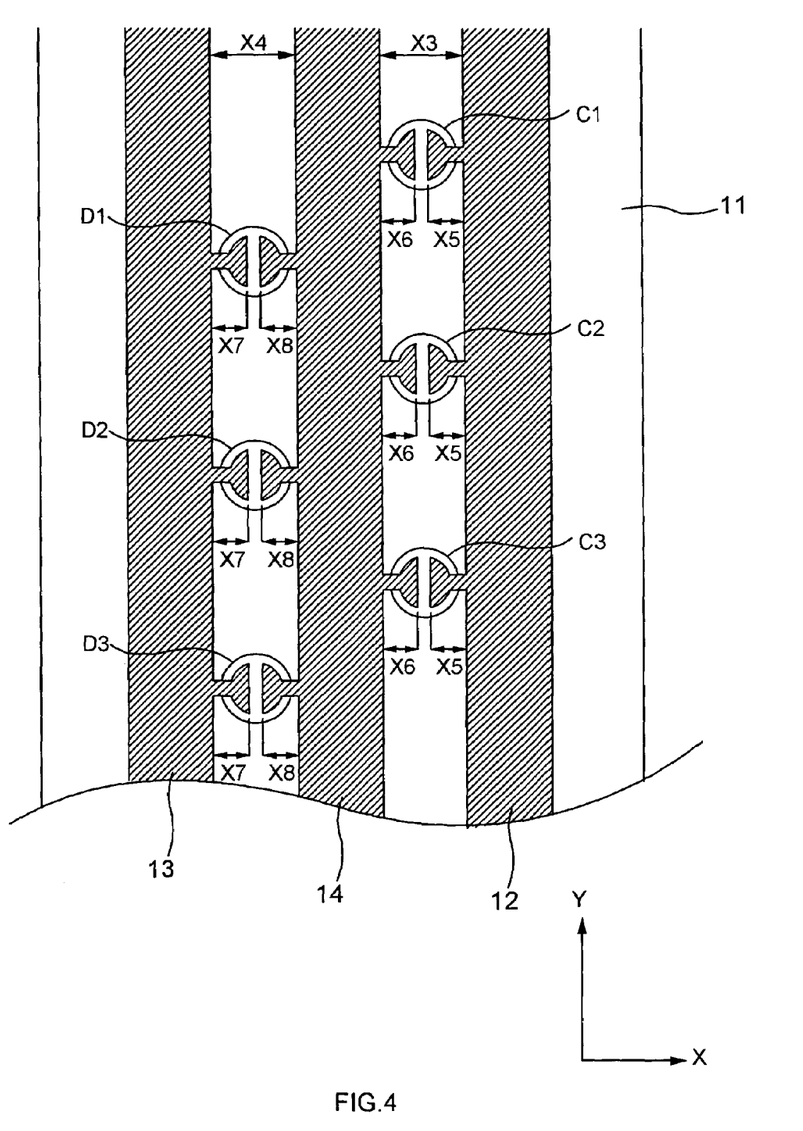
FIG. 4 is a view showing a second embodiment of the optical disk apparatus according to the present invention.

FIG. 4 shows a second embodiment of the present invention. With reference to FIGS. 1, 2, and 4, a specific configuration of short circuits and opening thereof between the anode and cathode electrodes of the laser emission device for CD and between the anode and cathode electrodes of the laser emission device for DVD of the optical pickup 9 of an optical disk apparatus that the present invention is applied to will be explained.

The lead-out board 11 is provided for electrically connecting the main circuit board 2 and the optical pickup 9 via the flexible printed board 3. A lead-out conductor 12 is connected to, e.g., the anode electrode of the laser emission device for CD and led out, a lead-out conductor 13 is connected to, e.g., the anode electrode of the laser emission device for DVD and led out, and a lead-out conductor 14 is connected to, e.g., both the cathode electrodes (for example, at ground potential) of the laser emission devices for CD and for DVD and led out. The lead-out conductor 14 is disposed between the lead-out conductors 12, 13 on the lead-out board 11 in the width direction (X direction) crossing the longitudinal direction of the lead-out conductors (Y direction). The lead-out conductor 12 is disposed a predetermined space X3 apart from the lead-out conductor 14 in the X direction, and the lead-out conductor 13 is disposed a predetermined space X4 apart from the lead-out conductor 14. Note that the predetermined spaces X3, X4 may be equal, or one may be longer than the other, and they can be set according to need.

Between the lead-out conductors 12 and 14, there are provided branch areas C (first branch areas) for short-circuiting the lead-out conductors 12 and 14 and opening the short circuit. In these branch areas C, the lead-out conductors 12 and 14 have respective branches extending from them and whose ends are opposite to each other. The branch extending from the lead-out conductor 12 and opposing to the other has a length X5 in the X direction and a predetermined length in the Y direction. The branch extending from the lead-out conductor 14 and opposing to the other has a length X6 in the X direction (X5+X6 being shorter than space X3) and a predetermined length in the Y direction. Note that the predetermined length in the Y direction of branch areas C may be equal to, shorter, or longer than the X-direction lengths X5, X6 and can be set according to need. The branches of branch area C become wider from the lead-out conductors 12, 14 towards the ends opposite to each other. A plurality of the branch areas C are disposed a predetermined space apart from each other in the Y direction between the lead-out conductors 12 and 14. In this embodiment, for example, three branch areas C1, C2, C3 are disposed. And by soldering any of branch areas C1, C2, C3, the anode and cathode electrodes of the laser emission device for CD are short-circuited. On the other hand, by removing solder from the any of branch areas C1, C2, C3, the short circuit between the anode and cathode electrodes of the laser emission device for CD is opened.

In contrast, between the lead-out conductors 13 and 14, there are provided branch areas D (second branch areas) for short-circuiting the lead-out conductors 13 and 14 and opening the short circuit. In these branch areas D, the lead-out conductors 13 and 14 have respective branches extending from them and whose ends are opposite to each other. The branch extending from the lead-out conductor 13 and opposing to the other has a length X7 in the X direction and a predetermined length in the Y direction. The branch extending from the lead-out conductor 14 and opposing to the other has a length X8 in the X direction (X7+X8 being shorter than space X4) and a predetermined length in the Y direction. Note that the predetermined length in the Y direction of branch areas D may be equal to, shorter, or longer than the X-direction lengths X7, X8 and can be set according to need. The branches of branch area D become wider from the lead-out conductors 13, 14 towards the ends opposite to each other. A plurality of the branch areas D are disposed a predetermined space apart from each other in the Y direction between the lead-out conductors 13 and 14. In this embodiment, for example, three branch areas D1, D2, D3 are disposed a predetermined space apart respectively from branch areas C1, C2, C3. Thus, branch areas C1, C2, C3 and D1, D2, D3 are disposed in a staggered pattern in the Y direction. And by soldering any of branch areas D1, D2, D3, the anode and cathode electrodes of the laser emission device for DVD are short-circuited. On the other hand, by removing solder from the any of branch areas D1, D2, D3, the short circuit between the anode and cathode electrodes of the laser emission device for DVD is opened. Note that an insulation layer is provided on the lead-out board 11 except branch areas C1, C2, C3 and D1, D2, D3.

In the present embodiment, in order to protect the laser emission device for CD of the optical pickup 9 from electrostatic from a worker performing the assembly of optical disk apparatuses, or the like, the anode and cathode electrodes of the laser emission device for CD are short-circuited by soldering any of branch areas C1, C2, C3. Likewise, in order to protect the laser emission device for DVD of the optical pickup 9 from electrostatic from a worker performing the assembly of optical disk apparatuses, or the like, the anode and cathode electrodes of the laser emission device for DVD are short-circuited by soldering any of branch areas D1, D2, D3.

On the other hand, in the assembly processes of the optical pickup 9 and of the optical disk apparatus, by removing solder from the any of branch areas C1, C2, C3 between the anode and cathode electrodes of the laser emission device for CD, the short-circuit between both electrodes of the laser emission device for CD is opened, and by removing solder from the any of branch areas D1, D2, D3 between the anode and cathode electrodes of the laser emission device for DVD, the short circuit between both electrodes of the laser emission device for DVD is opened.

According to the above second embodiment, during the assembly processes of the optical pickup and of the optical disk apparatus, soldering and unsoldering branch areas C1, C2, C3 are repeated at least three times for short-circuiting the anode and cathode electrodes of the laser emission device for CD and opening the short circuit. If, during that, the branch is peeled off by solder in any of branch areas C1, C2, C3, by soldering and unsoldering either of the other branch areas (C2, C3 where the branch has been peeled off in branch area C1), it is possible to short-circuit the anode and cathode electrodes of the laser emission device for CD and open the short circuit. If the branches to be connected extending from the lead-out conductors 12, 14 have been peeled off, the lead-out conductors 12, 14 will be left keeping their width thereby preventing the lead-out conductors 12, 14 from breaking. Moreover, the branches of branch area C1, C2, C3 become wider from the lead-out conductors 12, 14 towards the ends opposite each other, and hence it is possible to readily solder and unsolder.

Likewise, soldering and unsoldering branch areas D1, D2, D3 are repeated at least three times for short-circuiting the anode and cathode electrodes of the laser emission device for DVD and opening the short-circuit. If, during that, the branch is peeled off by solder in any of branch areas D1, D2, D3, by soldering and unsoldering either of the other branch areas (D2, D3 where the branch has been peeled off in branch area D1), it is possible to short-circuit the anode and cathode electrodes of the laser emission device for DVD and open the short circuit. If the branches to be connected extending from the lead-out conductors 13, 14 have been peeled off, the lead-out conductors 13, 14 will be left keeping their width thereby preventing the lead-out conductors 13, 14 from breaking.

Moreover, the branches of branch area D1, D2, D3 become wider from the lead-out conductors 13, 14 towards the ends opposite to each other, and hence it is possible to readily solder and unsolder. Furthermore, because branch areas C1, C2, C3 and D1, D2, D3 are disposed in a staggered pattern in the Y direction, if the branch in, e.g., branch area C1 and the branch in branch area D1 of the lead-out conductor 14 have been peeled off by solder, the lead-out conductor 14 will be left hardly reduced in width due to the peeling-off of the branches. In particular, where lead-free solder (Sn(tin)-Ag (silver)-Cu(copper)) with higher concentration of copper is used in which case the peeling-off of lead-out conductors is significant, it is possible to short-circuit the anode and cathode electrodes of the laser emission devices for CD and for DVD and open the short circuit without the lead-out conductors 12, 13, 14 peeled off.

THIRD EMBODIMENT

Figure 5:
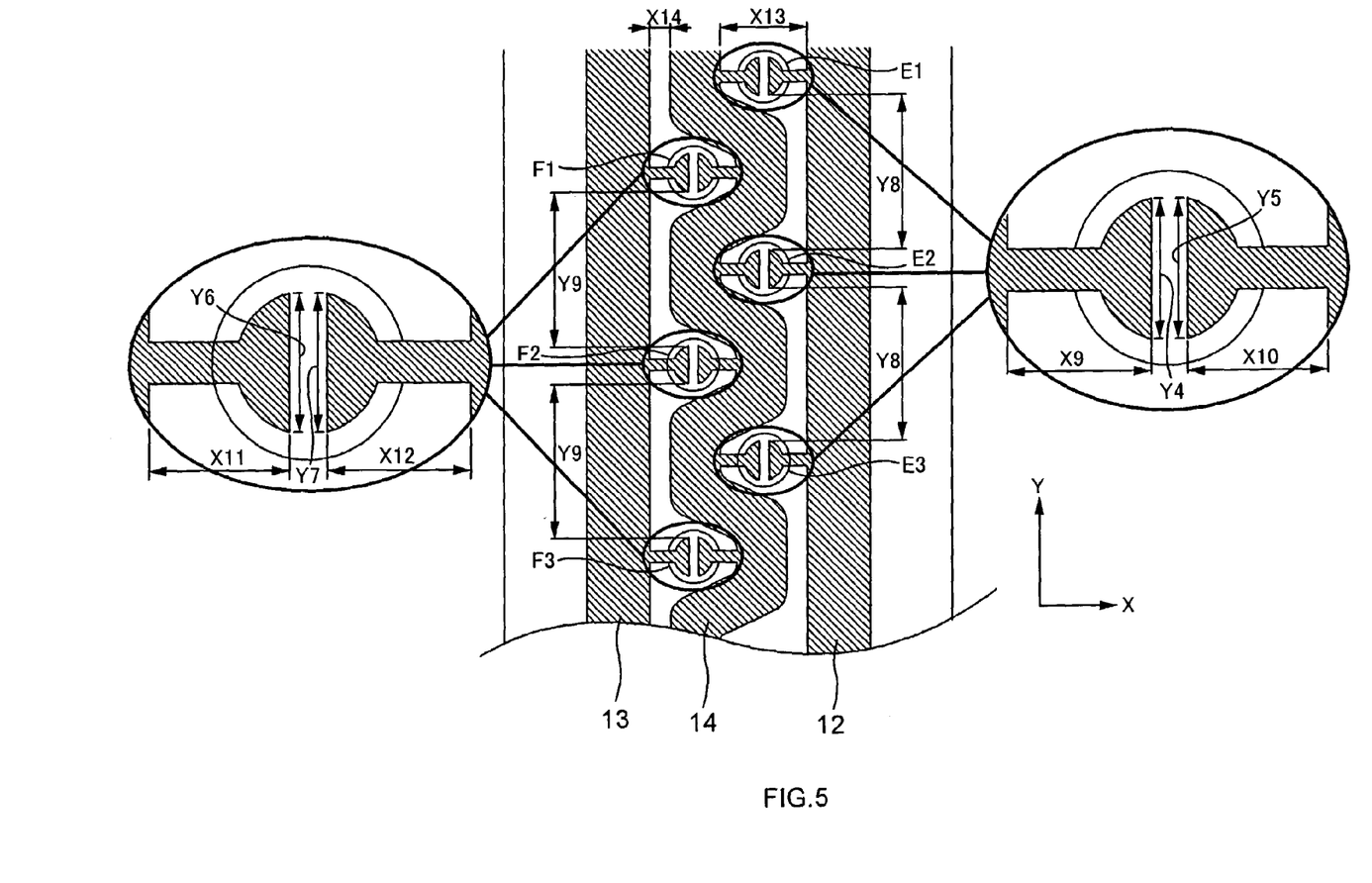
FIG. 5 is a view showing a third embodiment of the optical disk apparatus according to the present invention.

FIG. 5 shows a third embodiment of the present invention. With reference to FIGS. 1, 2, and 5, a specific configuration of short circuits and opening thereof between the anode and cathode electrodes of the laser emission device for CD and between the anode and cathode electrodes of the laser emission device for DVD of the optical pickup 9 of an optical disk apparatus that the present invention is applied to will be explained.

The lead-out board 11 is provided for electrically connecting the main circuit board 2 and the optical pickup 9 via the flexible printed board 3. A lead-out conductor 12 is connected to, e.g., the anode electrode of the laser emission device for CD and led out, a lead-out conductor 13 is connected to, e.g., the anode electrode of the laser emission device for DVD and led out, and a lead-out conductor 14 is connected to, e.g., both the cathode electrodes (for example, at ground potential) of the laser emission devices for CD and for DVD and led out. The lead-out conductor 14 is disposed between the lead-out conductors 12, 13 on the lead-out board 11 in the width direction (X direction) crossing the longitudinal direction of the lead-out conductors (Y direction).

Between the lead-out conductors 12 and 14, there are provided branch areas E (first branch areas) for short-circuiting the lead-out conductors 12 and 14 and opening the short circuit. In these branch areas E, the lead-out conductors 12 and 14 have respective branches extending from them and whose ends are opposite to each other. The branch extending from the lead-out conductor 12 and opposing to the other has a length X10 in the X direction and a predetermined length Y5 in the Y direction. The branch extending from the lead-out conductor 14 and opposing to the other has a length X9 in the X direction and a predetermined length Y4 in the Y direction.

Note that predetermined lengths Y4, Y5 in the Y direction of branch areas E may be equal to, shorter, or longer than the X-direction lengths X9, X10 and can be set according to need. The branches of branch area E become wider from the lead-out conductors 12, 14 towards the ends opposite to each other. A plurality of the branch areas E are disposed a predetermined space Y6 apart from each other in the Y direction between the lead-out conductors 12 and 14. In this embodiment, for example, three branch areas E1, E2, E3 are disposed. And by soldering any of branch areas E1, E2, E3, the anode and cathode electrodes of the laser emission device for CD are short-circuited. On the other hand, by removing solder from the any of branch areas E1, E2, E3, the short circuit between the anode and cathode electrodes of the laser emission device for CD is opened.

In contrast, between the lead-out conductors 13 and 14, there are provided branch areas F (second branch areas) for short-circuiting the lead-out conductors 13 and 14 and opening the short circuit. In these branch areas F, the lead-out conductors 13 and 14 have respective branches extending from them and whose ends are opposite to each other. The branch extending from the lead-out conductor 13 and opposing to the other has a length X1 in the X direction and a predetermined length Y6 in the Y direction. The branch extending from the lead-out conductor 14 and opposing to the other has a length X12 in the X direction and a predetermined length Y7 in the Y direction.

Note that predetermined lengths Y6, Y7 in the Y direction of branch areas F may be equal to, shorter, or longer than the X-direction lengths X11, X12 and can be set according to need. The branches of branch area F become wider from the lead-out conductors 13, 14 towards the ends opposite to each other. A plurality of the branch areas F are disposed a predetermined space apart from each other in the Y direction between the lead-out conductors 13 and 14. In this embodiment, for example, three branch areas F1, F2, F3 are disposed. And by soldering any of branch areas F1, F2, F3, the anode and cathode electrodes of the laser emission device for DVD are short-circuited. On the other hand, by removing solder from the any of branch areas F1, F2, F3, the short circuit between the anode and cathode electrodes of the laser emission device for DVD is opened.

Note that predetermined length Y8 in the Y direction of branch areas E is set to be longer than predetermined Y-direction lengths Y6, Y7 of the branches extending from the lead-out conductors 13, 14 and opposing to each other, and that predetermined length Y9 in the Y direction of branch areas F is set to be longer than predetermined Y-direction lengths Y4, Y5 of the branches extending from the lead-out conductors 12, 14 and opposing to each other. Thus, branch areas E1, E2, E3 and F1, F2, F3 are disposed in a staggered pattern in the Y direction. Moreover, along the X direction at the positions where branch areas E1, E2, E3 are disposed, space X14 between the lead-out conductors 13 and 14 (space in the width direction between two adjacent lead-out conductors of the other pair) is shorter than space X13 between the lead-out conductors 12 and 14 (space in the width direction between any two adjacent lead-out conductors). Also, along the X direction at the positions where branch areas F1, F2, F3 are disposed, the space between the lead-out conductors 12 and 14 (space in the width direction between any two adjacent lead-out conductors) is shorter than the space between the lead-out conductors 13 and 14 (space in the width direction between two adjacent lead-out conductors of the other pair). Note that an insulation layer is provided on the lead-out board 11 except branch areas E1, E2, E3 and F1, F2, F3.

Short circuits and opening thereof between the anode and cathode electrodes of the laser emission device for CD and between the anode and cathode electrodes of the laser emission device for DVD of the optical pickup 9 in the assembly processes of the optical pickup 9 and of the optical disk apparatus are the same as in the second embodiment.

According to the above third embodiment, during the assembly processes of the optical pickup and of the optical disk apparatus, soldering and unsoldering branch areas E1, E2, E3 are repeated at least three times for short-circuiting the anode and cathode electrodes of the laser emission device for CD and opening the short circuit. If, during that, the branch is peeled off by solder in any of branch areas E1, E2, E3, by soldering and unsoldering either of the other branch areas (E2, E3 where the branch has been peeled off in branch area E1), it is possible to short-circuit the anode and cathode electrodes of the laser emission device for CD and open the short circuit. If the branches to be connected extending from the lead-out conductors 12, 14 have been peeled off, the lead-out conductors 12, 14 will be left keeping their width thereby preventing the lead-out conductors 12, 14 from breaking. Moreover, the branches of branch area E1, E2, E3 become wider from the lead-out conductors 12, 14 towards the ends opposite to each other, and hence it is possible to readily solder and unsolder.

Likewise, soldering and unsoldering branch areas F1, F2, F3 are repeated at least three times for short-circuiting the anode and cathode electrodes of the laser emission device for DVD and opening the short circuit. If, during that, the branch is peeled off by solder in any of branch areas F1, F2, F3, by soldering and unsoldering either of the other branch areas (F2, F3 where the branch has been peeled off in branch area F1), it is possible to short-circuit the anode and cathode electrodes of the laser emission device for DVD and open the short circuit. If the branches to be connected extending from the lead-out conductors 13, 14 have been peeled off, the lead-out conductors 13, 14 will be left keeping their width thereby preventing the lead-out conductors 13, 14 from breaking. Moreover, the branches of branch area F1, F2, F3 become wider from the lead-out conductors 13, 14 towards the ends opposite to each other, and hence it is possible to readily solder and unsolder.

Furthermore, because branch areas E1, E2, E3 and F1, F2, F3 are disposed in a staggered pattern in the Y direction, if the branch in, e.g., branch area E1 and the branch in branch area F1 of the lead-out conductor 14 have been peeled off by solder, the lead-out conductor 14 will be left hardly reduced in width due to the peeling-off of the branches. Moreover, along the X direction at the positions where branch areas E1, E2, E3 are disposed, space X14 between the lead-out conductors 13 and 14 (space in the width direction between two adjacent lead-out conductors of the other pair) is shorter than space X13 between the lead-out conductors 12, 14 (space in the width direction between any two adjacent lead-out conductors). Also, along the X direction at the positions where branch areas F1, F2, F3 are disposed, the space between the lead-out conductors 12 and 14 (space in the width direction between any two adjacent lead-out conductors) is shorter than the space between the lead-out conductors 13, 14 (space in the width direction between two adjacent lead-out conductors of the other pair). Hence, the space between the lead-out conductors 12 and 14 on the lead-out board 11 can be made narrower compared with the second embodiment. Thus, the lead-out board 11 can be made smaller or the other wire lines of the optical pickup 9 can be effectively arranged. In particular, where lead-free solder (Sn(tin)-Ag(silver)-Cu(copper)) with higher concentration of copper is used in which case the peeling-off of lead-out conductors is significant, it is possible to short-circuit the anode and cathode electrodes of the laser emission devices for CD and for DVD and open the short circuit without the lead-out conductors 12, 13, 14 peeled off.

FOURTH EMBODIMENT

Figure 6:
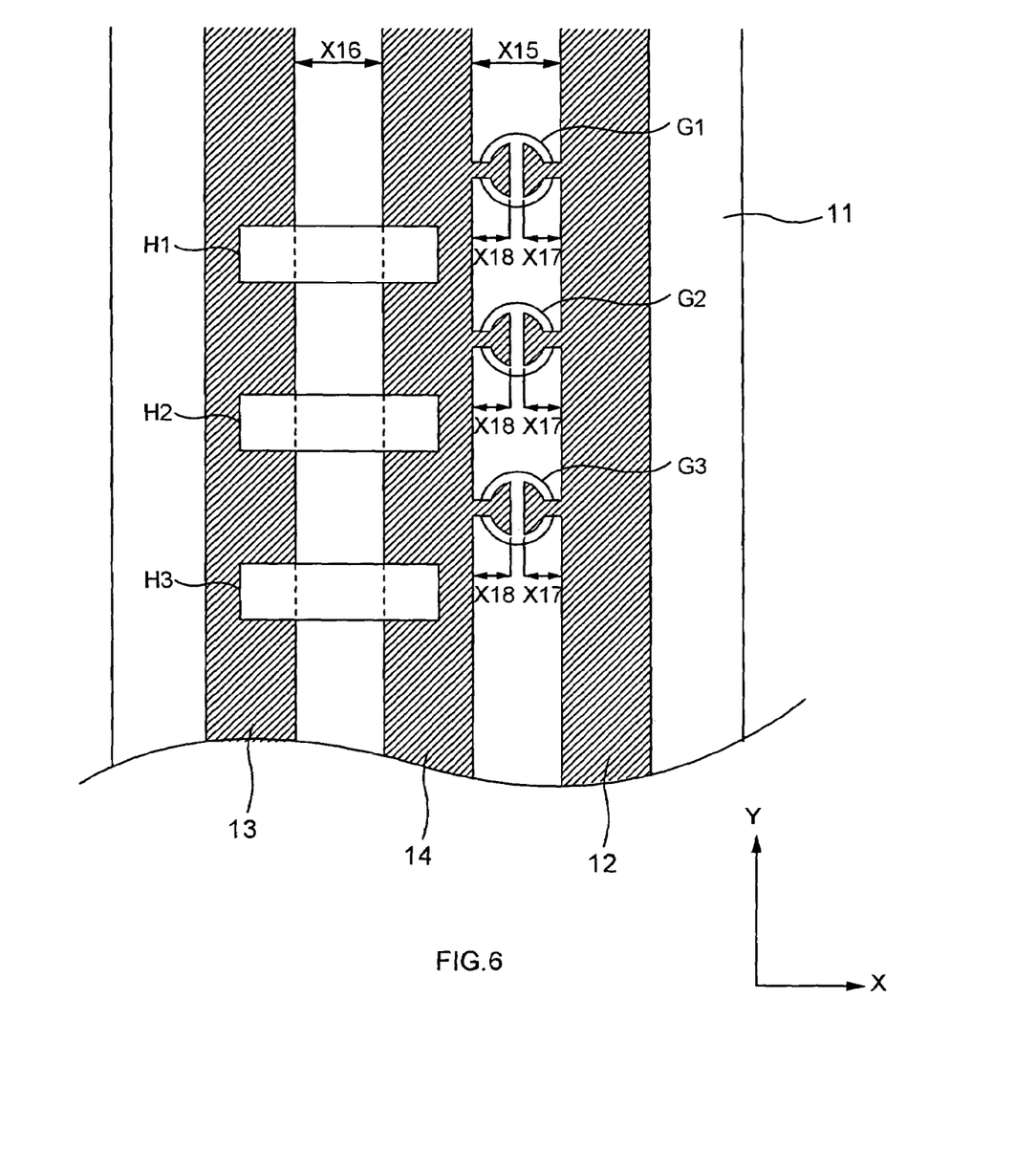
FIG. 6 is a view showing a fourth embodiment of the optical disk apparatus according to the present invention.

FIG. 6 shows a fourth embodiment of the present invention. With reference to FIGS. 1, 2, and 6, a specific configuration of short circuits and opening thereof between the anode and cathode electrodes of the laser emission device for CD and between the anode and cathode electrodes of the laser emission device for DVD of the optical pickup 9 of an optical disk apparatus that the present invention is applied to will be explained.

The lead-out board 11 is provided for electrically connecting the main circuit board 2 and the optical pickup 9 via the flexible printed board 3. A lead-out conductor 12 is connected to, e.g., the anode electrode of the laser emission device for CD and led out, a lead-out conductor 13 is connected to, e.g., the anode electrode of the laser emission device for DVD and led out, and a lead-out conductor 14 is connected to, e.g., both the cathode electrodes (for example, at ground potential) of the laser emission devices for CD and for DVD and led out. The lead-out conductor 14 is disposed between the lead-out conductors 12, 13 on the lead-out board 11 in the width direction (X direction) crossing the longitudinal direction of the lead-out conductors (Y direction). The lead-out conductors 12 is disposed a predetermined space X15 apart from the lead-out conductor 14 in the X direction, and the lead-out conductors 13 is disposed a predetermined space X16 apart from the lead-out conductor 14. Note that the predetermined spaces X15, X16 may be equal, or one may be longer than the other, and they can be set according to need.

Between the lead-out conductors 12 and 14, there are provided branch areas G for short-circuiting the lead-out conductors 12 and 14 and opening the short circuit. In these branch areas G, the lead-out conductors 12 and 14 have respective branches extending from them and whose ends are opposite to each other. The branch extending from the lead-out conductor 12 and opposing to the other has a length X17 in the X direction and a predetermined length in the Y direction. The branch extending from the lead-out conductor 14 and opposing to the other has a length X18 in the X direction (X17+X18 being shorter than space X15) and a predetermined length in the Y direction. Note that the predetermined length in the Y direction of branch areas G may be equal to, shorter, or longer than the X-direction lengths X17, X18 and can be set according to need. The branches of branch area G become wider from the lead-out conductors 12, 14 towards the ends opposite to each other. A plurality of the branch areas G are disposed a predetermined space apart from each other in the Y direction between the lead-out conductors 12 and 14. In this embodiment, for example, three branch areas G1, G2, G3 are disposed. And by soldering any of branch areas G1, G2, G3, the anode and cathode electrodes of the laser emission device for CD are short-circuited. On the other hand, by removing solder from the any of branch areas G1, G2, G3, the short circuit between the anode and cathode electrodes of the laser emission device for CD is opened.

In contrast, between the lead-out conductors 13 and 14, there are provided connection areas H for short-circuiting the lead-out conductors 13 and 14 and opening the short circuit. These connection areas H have a length covering opposite parts of the lead-out conductors 13 and 14 (longer than space X16) partially in the X direction and a predetermined length in the Y direction. Note that the length in the Y direction of connection areas H may be equal to, shorter, or longer than the X-direction length thereof and can be set according to need. A plurality of the connection areas H are disposed in the Y direction between the lead-out conductors 13 and 14. In this embodiment, for example, three connection areas H1, H2, H3 are disposed a predetermined space apart respectively from branch areas G1, G2, G3. Thus, branch areas G1, G2, G3 and connection areas H1, H2, H3 are disposed in a staggered pattern in the Y direction. And by soldering any of connection areas H1, H2, H3, the anode and cathode electrodes of the laser emission device for DVD are short-circuited. On the other hand, by removing solder from the any of connection areas H1, H2, H3, the short circuit between the anode and cathode electrodes of the laser emission device for DVD is opened. Note that an insulation layer is provided on the lead-out board 11 except branch areas G1, G2, G3 and connection areas H1, H2, H3.

In the present embodiment, in order to protect the laser emission device for CD of the optical pickup 9 from electrostatic from a worker performing the assembly of optical disk apparatuses, or the like, the anode and cathode electrodes of the laser emission device for CD are short-circuited by soldering any of branch areas G1, G2, G3. Likewise, in order to protect the laser emission device for DVD of the optical pickup 9 from electrostatic from a worker performing the assembly of optical disk apparatuses, or the like, the anode and cathode electrodes of the laser emission device for DVD are short-circuited by soldering any of connection areas H1, H2, H3.

On the other hand, in the assembly processes of the optical pickup 9 and of the optical disk apparatus, by removing solder from the any of branch areas G1, G2, G3, the short circuit between the anode and cathode electrodes of the laser emission device for CD is opened, and by removing solder from connection areas H1, H2, H3, the short-circuit between the anode and cathode electrodes of the laser emission device for DVD is opened.

According to the above fourth embodiment, during the assembly processes of the optical pickup and of the optical disk apparatus, the effect of branch areas G1, G2, G3 on short-circuiting the anode and cathode electrodes of the laser emission device for CD and opening the short circuit and on the lead-out conductors 12, 14 is the same as in the second embodiment. The effect of connection areas H1, H2, H3 on short-circuiting the anode and cathode electrodes of the laser emission device for DVD and opening the short circuit and on the lead-out conductors 13, 14 is the same as in the first embodiment. Furthermore, because branch areas G1, G2, G3 and connection areas H1, H2, H3 are disposed in a staggered pattern in the Y direction, if the branch of the lead-out conductor 14 has been peeled off in, for example, branch area G1 and the lead-out conductor 14 has been partially peeled off at connection area H1 by solder, the lead-out conductor 14 will be left hardly reduced in width due to the peeling-off of the branch. In particular, where lead-free solder (Sn(tin)-Ag(silver)-Cu(copper)) with higher concentration of copper is used in which case the peeling-off of lead-out conductors is significant, it is possible to short-circuit the anode and cathode electrodes of the laser emission devices for CD and for DVD and open the short circuits even if the lead-out conductors 13, 14 are peeled off partially.

OTHER EMBODIMENTS

Although short circuits and opening thereof between the anode and cathode electrodes of the laser emission device for CD and between the anode and cathode electrodes of the laser emission device for DVD of the optical pickup of the optical disk apparatus according to the present invention have been described, the above description is provided to facilitate the understanding of the present invention and not intended to limit the present invention. It should be understood that various changes and alterations can be made therein without departing from the spirit and scope of the present invention.

<<Shape of the Connection Areas>>

Although in the first and fourth embodiments connection areas are rectangular, as long as having a length covering opposite parts of the lead-out conductors in the X direction (longer than the space between the lead-out conductors), the connection areas may have any shape such as a square, circle, or ellipse.

<<Shape of the Branches of the Branch Area>>

Although in the second, third and fourth embodiments the branches in the branch area extending from the lead-out conductors have respective opposite connection portions shaped in half circle, the connection portions may be of any shape such as a triangle or a quadrangle as long as the connection portions become wider towards their opposite ends.

<<Arrangement of the Lead-Out Conductors>>

Although in the arrangement in the X direction of the lead-out conductors 12, 13, 14 in the first to fourth embodiments, the lead-out conductor 14 is disposed between the lead-out conductors 12 and 13, the lead-out conductor 14 need not be disposed between the lead-out conductors 12 and 13 if the laser emission devices for CD and for DVD need not be short-circuited at the same time, and the arrangement in the X direction of the lead-out conductors 12, 13, 14 may be changed according to need.

What is claimed is:

1. An optical disk apparatus comprising:
    an optical pickup that has a first laser emission device emitting laser light for recording or playing back signals on or from a first disk medium and a second laser emission device emitting laser light for recording or playing back signals on or from a second disk medium different in a signal format from the first disk medium;
    a lead-out board on which a first lead-out conductor connected to one electrode of the first laser emission device and led out, a second lead-out conductor connected to one electrode, which is of the same polarity as the one electrode of the first laser emission device, of the second laser emission device and led out, and a third lead-out conductor connected to both the other electrodes of the first and second laser emission devices and led out are arranged respective predetermined spaces apart, and which is to be electrically connected to a circuit board having circuits for driving an optical disk apparatus mounted thereon;
    first connection areas to short-circuit by solder at a portion of opposing parts of any two adjacent lead-out conductors of the first, second, and third lead-out conductors partially in the width direction crossing the longitudinal direction and to open the short circuit; and second connection areas to short-circuit by solder at a portion of opposing parts of the other pair of two adjacent lead-out conductors of the first, second, and third lead-out conductors partially in the width direction crossing the longitudinal direction and to open the short circuit, wherein the first connection areas and the second connection areas are arranged in a staggered pattern in the longitudinal direction of the lead-out conductors.

2. The optical disk apparatus according to claim 1, wherein at least either of the first connection areas and the second connection areas are arranged in plurality in the longitudinal direction.

3. The optical disk apparatus according to claim 1, wherein the third lead-out conductor is arranged between the first lead-out conductor and the second lead-out conductor in the longitudinal direction.

4. An optical disk apparatus comprising:

an optical pickup that has a first laser emission device emitting laser light for recording or playing back signals on or from a first disk medium and a second laser emission device emitting laser light for recording or playing back signals on or from a second disk medium different in a signal format from the first disk medium;

a lead-out board on which a first lead-out conductor connected to one electrode of the first laser emission device and led out, a second lead-out conductor connected to one electrode, which is of the same polarity as the one electrode of the first laser emission device, of the second laser emission device and led out, and a third lead-out conductor connected to both the other electrodes of the first and second laser emission devices and led out are arranged respective predetermined spaces apart, and which is to be electrically connected to a circuit board having circuits for driving an optical disk apparatus mounted thereon;

first branch areas having branches extending from any two adjacent lead-out conductors of the first, second, and third lead-out conductors in the width direction crossing the longitudinal direction and opposing to each other at their ends to short-circuit by solder the any two adjacent lead-out conductors and to open the short circuit; and second branch areas having branches extending from the other pair of two adjacent lead-out conductors of the first, second, and third lead-out conductors in the width direction crossing the longitudinal direction and opposing to each other at their ends to short-circuit by solder the two adjacent lead-out conductors of the other pair and to open the short-circuit, wherein the first branch area and the second branch area are arranged in the longitudinal direction of the lead-out conductors.

5. The optical disk apparatus according to claim 4, wherein at least either of the first branch area and the second branch area are arranged in plurality in the longitudinal direction.

6. The optical disk apparatus according to claim 4, wherein the first branch areas and the second branch areas are arranged in a staggered pattern in the longitudinal direction.

7. The optical disk apparatus according to claim 6, wherein along the width direction crossing the longitudinal direction of the first, second, and third lead-out conductors at the first branch areas provided, the space in the width direction between the two adjacent lead-out conductors of the other pair is shorter than the space in the width direction between the any two adjacent lead-out conductors and, along the width direction crossing the longitudinal direction of the first, second, and third lead-out conductors at the second branch areas provided, the space in the width direction between the any two adjacent lead-out conductors is shorter than the space in the width direction between the two adjacent lead-out conductors of the other pair.

8. The optical disk apparatus according to claim 4, wherein the branches of the first branch area become wider from the any two adjacent lead-out conductors towards their ends and the branches of the second branch area become wider from the other pair of two adjacent lead-out conductors towards their ends.

9. The optical disk apparatus according to claim 4, wherein the third lead-out conductor is arranged between the first lead-out conductor and the second lead-out conductor in the longitudinal direction.

10. An optical disk apparatus comprising:

an optical pickup that has a first laser emission device emitting laser light for recording or playing back signals on or from a first disk medium and a second laser emission device emitting laser light for recording or playing back signals on or from a second disk medium different in a signal format from the first disk medium;

a lead-out board on which a first lead-out conductor connected to one electrode of the first laser emission device and led out, a second lead-out conductor connected to one electrode, which is of the same polarity as the one electrode of the first laser emission device, of the second laser emission device and led out, and a third lead-out conductor connected to both the other electrodes of the first and second laser emission devices and led out are arranged respective predetermined spaces apart, and which is to be electrically connected to a circuit board having circuits for driving an optical disk apparatus mounted thereon;

connection areas to short-circuit by solder at a portion of opposite parts of any two adjacent lead-out conductors of the first, second, and third lead-out conductors partially in the width direction crossing the longitudinal direction and to open the short circuit; and branch areas having branches extending from the other pair of two adjacent lead-out conductors of the first, second, and third lead-out conductors in the width direction crossing the longitudinal direction and opposing to each other at their ends to short-circuit by solder the two adjacent lead-out conductors of the other pair and to open the short circuit, wherein the connection areas and the branch areas are arranged in the longitudinal direction of the lead-out conductors.

* * * * *